US011354282B2

(12) United States Patent
Oberhofer et al.

(10) Patent No.: US 11,354,282 B2
(45) Date of Patent: *Jun. 7, 2022

(54) CLASSIFYING AN UNMANAGED DATASET

(71) Applicant: International Business Machines Corporation, Armonk, NY (US)

(72) Inventors: Martin Oberhofer, Pondorf (DE); Adapala S. Reddy, Andhra pradesh (IN); Yannick Saillet, Stuttgart (DE); Jens Seifert, Gaertringen (DE)

(73) Assignee: International Business Machinos Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/739,720

(22) Filed: Jan. 10, 2020

(65) Prior Publication Data
US 2020/0151155 A1 May 14, 2020

Related U.S. Application Data

(63) Continuation of application No. 15/480,501, filed on Apr. 6, 2017, now Pat. No. 10,592,481, which is a
(Continued)

(51) Int. Cl.
*G06Q 10/00* (2012.01)
*G06F 16/21* (2019.01)
(Continued)

(52) U.S. Cl.
CPC ............ *G06F 16/211* (2019.01); *G06F 7/20* (2013.01); *G06F 16/2282* (2019.01); *G06F 16/285* (2019.01)

(58) Field of Classification Search
CPC .. G06F 16/211; G06F 16/285; G06F 16/2282; G06F 7/20
(Continued)

(56) References Cited

U.S. PATENT DOCUMENTS 10,055,430 B2    8/2018 Oberhofer
2011/0161333 A1  6/2011 Langseth
(Continued)

OTHER PUBLICATIONS

IBM: List of IBM Patents or Patent Applications Treated as Related (Appendix P), Jan. 28, 2020, pp. 1-2.
(Continued)

*Primary Examiner* — Isaac M Woo
(74) *Attorney, Agent, or Firm* — Michael O'Keefe

(57) ABSTRACT

A computer implemented method for classifying at least one source dataset of a computer system. The method may include providing a plurality of associated reference tables organized and associated in accordance with a reference storage model in the computer system. The method may also include calculating, by a data classifier application of the computer system, a first similarity score between the source dataset and a first reference table of the reference tables based on common attributes in the source dataset and a join of the first reference table with at least one further reference table of the reference tables having a relationship with the first reference table. The method may further include classifying, by the data classifier application, the source dataset by determining using at least the calculated first similarity score whether the source dataset is organized as the first reference table in accordance to the reference storage model.

12 Claims, 5 Drawing Sheets

Related U.S. Application Data continuation of application No. 14/882,983, filed on Oct. 14, 2015, now Pat. No. 10,055,430.

(51) Int. Cl.
*G06F 16/28* (2019.01)
*G06F 16/22* (2019.01)
*G06F 7/20* (2006.01)

(58) Field of Classification Search
USPC .................................................. 707/600–899
See application file for complete search history.

(56) References Cited

U.S. PATENT DOCUMENTS

| | | |
|---|---|---|
| 2012/0066214 A1 | 3/2012 | Nelke |
| 2013/0238621 A1 | 9/2013 | Ganjam |
| 2014/0059017 A1 | 2/2014 | Chaney |
| 2014/0278406 A1 | 9/2014 | Tsumura |
| 2014/0379667 A1 | 12/2014 | Hollifield |
| 2015/0134672 A1* | 5/2015 | Ren .................. G06F 16/137 707/747 |
| 2017/0109424 A1 | 4/2017 | Oberhofer |
| 2017/0212953 A1 | 7/2017 | Oberhofer |

OTHER PUBLICATIONS

IBM: List of IBM Patents or Patent Applications Treated as Related (Appendix P), Jan. 10, 2020, pp. 1-2.

Oberhofer, et al., Pending U.S. Appl. No. 14/882,983, filed Oct. 14, 2015, titled "A Method for Classifying an Unmanaged Dataset", pp. 1-27.

IBM: List of IBM Patents or Patent Applications Treated as Related (Appendix P), Dec. 31, 2021, pp. 1-2.

Oberhofer et al., "Method for Classifying an Unmanaged Dataset," Application and Drawings, filed on Nov. 16, 2021, 24 Pages, U.S. Appl. No. 17/455,068.

* cited by examiner

CLASSIFYING AN UNMANAGED DATASET

FIELD OF INVENTION

The invention relates to computing systems, and more particularly to a method for classifying datasets.

BACKGROUND

Unmanaged datasets can come in various structures and forms. For example, an acquisition system with little or no documentation may be the source of unmanaged datasets. Yet another source of unmanaged data sets is the rise of Big Data where data from a variety of sources is loaded for example into a Hadoop platform. In such an environment, for example, text analytics could find example in free text interesting values which can be annotated with metadata producing value sets with a bit of metadata associated with it. Understanding the datasets in such systems may be the first step to determine if there is a potential of data consolidation reducing IT costs or to understand if the data assets are properly managed.

SUMMARY

Various embodiments provide a method for classifying a dataset, computer program product and computer system as described by the subject matter of the independent claims. Advantageous embodiments are described in the dependent claims. Embodiments of the present invention can be freely combined with each other if they are not mutually exclusive.

According to an embodiment of the present invention, a computer implemented method for classifying at least one source dataset of a computer system is described. The method includes: providing a plurality of associated reference tables organized and associated in accordance with a reference storage model in the computer system; calculating, by a database application of the computer system, a first similarity score between the source dataset and a first reference table of the reference tables based on common attributes in the source dataset and a join of the first reference table with at least one further reference table of the reference tables having a relationship with the first reference table; classifying, by the database application, the source dataset by determining, using at least the calculated first similarity score, whether the source dataset is organized as the first reference table in accordance the reference storage model.

According to an embodiment of the present invention, a computer program product for classifying at least one source dataset is described, the computer program product includes a computer readable storage medium having program instructions embodied therewith, the program instructions executable by a processor to cause the processor to provide a plurality of associated reference tables organized and associated in accordance with a reference storage model; calculate a first similarity score between the source dataset and a first reference table of the reference tables based on common attributes in the source dataset and a join of the first reference table with at least one further reference table of the reference tables having a relationship with the first reference table; classify the source dataset by determining using at least the calculated first similarity score whether the source dataset is organized as the first reference table in accordance the reference storage model.

According to an embodiment of the present invention, a computer system for classifying at least one source dataset is described. The computer system is configured for: providing a plurality of associated reference tables organized and associated in accordance with a reference storage model; calculating a first similarity score between the source dataset and a first reference table of the reference tables based on common attributes in the source dataset and a join of the first reference table with at least one further reference table of the reference tables having a relationship with the first reference table; classifying the source dataset by determining using at least the calculated first similarity score whether the source dataset is organized as the first reference table in accordance the reference storage model.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

Figure 1:
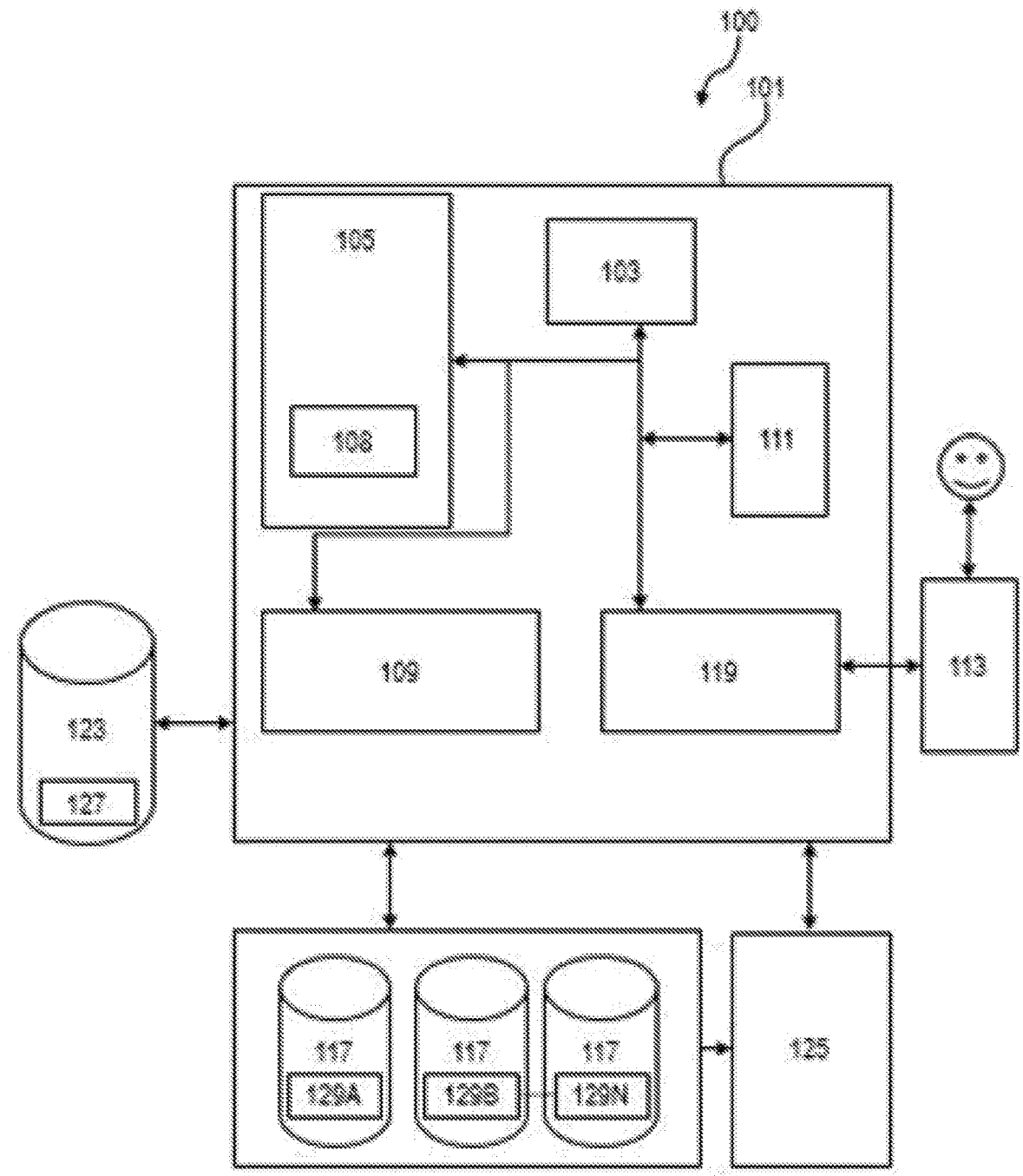
FIG. 1 depicts a functional block diagram illustrating a data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, like numbered elements in the figures either designate similar elements or designate elements that perform an equivalent function. Elements which have been discussed previously will not necessarily be discussed in later figures if the function is equivalent.

The above features may provide an accurate method for classifying datasets in particular unmanaged (or unknown) datasets. This may further enable an efficient and optimal storage and/or analysis of those datasets, which may save resources compared to the case of a (blind) access to unmanaged data. The present method may be particularly advantageous in case of Big Data; where managing a dataset may become a labor and tedious task. This is because many Big Data analytics scenario rely on the combination of these unmanaged data sets and the managed data sets, e.g. Big data security analytics Social media analytics to understand customers.

Another advantage may be that the present method may provide a larger sample of data that can be used for analysis, in that the analyzed datasets (unmanaged datasets) may become a valued resource of information. This is in contrast to a conventional method although these datasets are stored they are not used as they cannot be used as a valued resource.

The present method may enable a better cataloguing of datasets from the use of references. This may improve knowledge and understanding of data, with subsequent reduction of the risk of duplication or loss.

Further, a better data organization and maintenance following the present data classification may enable a better control over access to data, by for example following defined policies and data security.

Still further, the present method may provide a more timely information in that access may be performed to the right information at the right time avoiding of wrong or conflicting information, through the use of the present classification method. The present may improve access to data, preventing unnecessary obstacles due to unclassified or unmanaged data.

For example, the source dataset may comprise an unmanaged dataset. For example, the reference tables relate to each other by foreign key relationships as defined by the reference storage model.

The term "unmanaged data" as used herein refers to data having unknown source, unknown identity, unnamed data and/or unstructured data. An example of unmanaged data is data that is stored as a non-relational database. A source of the unmanaged data may be Internet. For example, the data collected over the Internet may not have enough metadata associated with, that allows an identification of data domains (e.g. address, part, person, order, etc.) the data values sets belong to.

According to one embodiment, the method further comprises repeating the step of calculating for a second reference table of the reference tables, wherein determining comprises comparing the first and second similarity scores for determining whether the source dataset is organized as the first reference table or as the second reference table within the reference storage model. In this embodiment, the analysis will be performed as the second reference table if the source dataset is classified as the second reference table. In case of repeating using the second reference table, the first reference table (that is used as a seed in the previous iteration) may be selected as a further reference table for comparing the second reference table with the source dataset as described above.

Increasing the "compared-to" sample may further increase the accuracy of the present classification method and may thus further ensure that source datasets are suitable for further exploitation such as their integration with other datasets (e.g. the reference tables) and may save processing resources for collecting data from other sources.

According to one embodiment, the repeating is performed in response to determining that the first similarity score is smaller than a predefined similarity threshold. This embodiment may have the advantage of saving processing resources that would otherwise be required for treating all the reference tables at once.

According to one embodiment, the at least one further reference table is selected based on at least one of the conditions: the further reference table has a direct relationship with the first reference table; the further reference table has an indirect relationship with the first reference table; the number of common attributes between the source dataset and the further reference table is smaller than the number of common attributes between the source dataset and the first reference table. This embodiment may further increase the accuracy of the present classification method and may save processing resources by using only relevant reference tables for classifying the source dataset.

According to one embodiment, the source dataset is received from a source system or imported from the source system or generated, wherein the source dataset comprises at least one of: a table, a text file, content of a document. For example, the source dataset may have a structured format and especially hierarchical formats like XML, JSON, etc. In another example, the source dataset may comprise binary data like photos/videos, where the attributes may be tags embedded in the source dataset, or color distribution of pixels etc. For example, the source dataset may comprise a table having one or more columns, wherein the columns are unnamed or unknown e.g. there are only attribute values in the columns but no indication of the attribute/column e.g. the type, name etc. of the attribute. The source dataset may comprise multiple single tables that are not related to each others. This embodiment may increase the efficiency of the present method by enabling the data classification in accordance with the present method for a large variety of source datasets.

According to one embodiment, calculating the first similarity score comprises: calculating a partial similarity score between the source dataset and each table of the first reference table and the at least one further reference table based on respective common attributes; and combining the partial similarity scores by weighting the partial similarity scores in accordance with the dependency order and the direction of the relationship between the first reference table and each of the at least one further reference table. This embodiment may further increase the accuracy of the present classification method, and may thus further enhance or improve the above mentioned advantages of the present method. The dependency order may, for example, indicate the depth position/relation of the further reference table with respect to the first reference table. For example, the first reference table may be a parent table and the further reference table may be a first or second or other level children table in case of a hierarchical storage model.

In another example, the dependency order may be user predefined i.e. a user may define the relationship between the reference tables. For example, a user table may be associated with a first system table (e.g. the first system may relate to a local area network), wherein the first system table is related to a second system table (e.g. the second system may relate to a global area network such as internet etc.). In this case, the user table has a direct relationship with the first system table and thus the dependency order is equal to 1, while the user table has an indirect relationship with the second system table and thus the dependency order is 2.

According to one embodiment, the first reference table is related to the at least one further reference table via a primary key-foreign key (FK) relationship, wherein the direction indicates the originating table of the relationship which of the first and further reference table comprises the primary key, wherein the dependency order indicates the depth or number of the FKs that separate between the first reference table and the further reference table. This embodiment may have the advantage of providing a classification method that may be seamlessly integrated with existing systems that use SQL like model for storing data.

According to one embodiment, calculating the partial similarity score between the source dataset and the at least one further reference table comprises: processing at least one match rule for matching values of an attribute of the source dataset with attribute values of the further reference table; determining a matching score indicating the level of matching between content of the source dataset and content of the further reference table, wherein the lowest the matching score the highest the partial similarity score. This embodiment may further increase the accuracy of the present classification method. This embodiment may be executed for the first reference table; however, in this case, the highest the matching score the highest the partial similarity score.

According to one embodiment, first similarity score is calculated with the following formula:

$$Score = \sum_{dist=0}^{n} \frac{S_{dist}}{1+dist},$$

where $$S_{dist} = \sum_{d=0}^{ds} \frac{2 * W_d}{N_{DS} + N_{DT}},$$

ds is the number of common attributes, $W_d = 1/\text{card}(D)$ where card(D) is the cardinality of an attribute D in the reference tables, $N_{DS}$ is the number of attributes in the source dataset, $N_{DT}$ is the number of attributes in the reference tables, dist is the distance in terms of number of FKs between the first reference table and the at least one further reference table, dist=0 refers to the first reference table, and dist>0 refer to the at least one further reference table.

According to one embodiment, determining a common attribute between the source dataset and the first reference table or the further reference table comprises: determining a first attribute domain for the common attribute in the source dataset; determining a second attribute domain for the common attribute in the first reference table, and determining that the first attribute domain is equal to the second attribute domain. In another example, determining a common attribute between the source dataset and the first reference table or the further reference table comprises determining that the attribute name of the common attribute in the source dataset is the same as the attribute name of the common attribute in the first reference table or the further reference table. Other methods for comparing two attributes or columns may be used.

The term "attribute domain" as used herein refers to the set of values allowed in an attribute.

According to one embodiment, classifying the source dataset comprises comparing the first similarity score with a predefined similarity threshold.

According to one embodiment, the method further comprises using the storage model and at least part of the reference tables for analyzing the source dataset. This embodiment may have the advantage of increasing the analysis sample (for free in that the unmanaged/source dataset is already available) without need to request additional data from other sources that may be better integrable with the reference datasets in case the present method is not used. This may provide the ability to integrate source datasets with reference tables.

Another advantage may be that the present method may be less error prone.

FIG. 1 depicts a functional block diagram illustrating a data processing system or computer system 100 according to an example embodiment of the present invention. The data processing system 100 may for example comprise an IBM i system.

The data processing system 100 comprises a computer system 101. The components of computer system 101 may include, but are not limited to, one or more processors or processing units 103, a storage system 111, a memory unit 105, and a bus 107 that couples various system components including memory unit 105 to processor 103. Storage system 111 may include a hard disk drive (HDD). Memory unit 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as a keyboard, a pointing device, a display 113, etc.; one or more devices that enable a user to interact with data processing system 100; and/or any devices (e.g., network card, modem, etc.) that enable data processing system 100 to communicate with one or more other computing devices. Such communication can occur via I/O interface(s) 119. Still yet, data processing system 100 can communicate with one or more networks such as a local area network (LAN), a general wide area network (WAN), and/or a public network (e.g., the Internet) via network adapter 109. As depicted, network adapter 109 communicates with the other components of data processing system 100 via bus 107.

Memory unit 105 is configured to store applications that are executable on the processor 103. For example, the memory system 105 may comprise an operating system as well as application programs.

The application programs comprise a data classifier application 108 (e.g. a database application). The data classifier application 108 may receive as inputs the dataset 127 and reference tables 129A-N.

The data processing system 100 may further comprise a data source system 123. The data source system 123 may for example comprise a Hadoop platform. The data source system 123 may provide and store datasets 127. The datasets 127 may for example be unmanaged datasets in that they are provided in the form of system log files, or other text files, emails etc. The data source system 123 is connected to the computer system 101 via one or more networks for example, the Internet, a local area network, a wide area network and/or a wireless network.

The data processing system 100 may further comprise a metadata repository 125 such as IBM InfoSphere Business Glossary, XMETA, etc.) that is used to manage technical and operational metadata as well as policies and execution rules governing reference data stored in databases 117. The metadata may for example be used to describe the content and data domains of reference tables 129.

Databases 117 may support for example different storage models or techniques such as relational, columnar, XML, graph, hierarchical database model etc. that are representative for persistent repositories used to store data.

Databases 117 and metadata repository 125 are connected to the computer system 101 via one or more networks for example, the Internet, a local area network, a wide area network and/or a wireless network.

The operation of the data processing system 100 will be described in details with reference to FIGS. 2-5.

Figure 2:
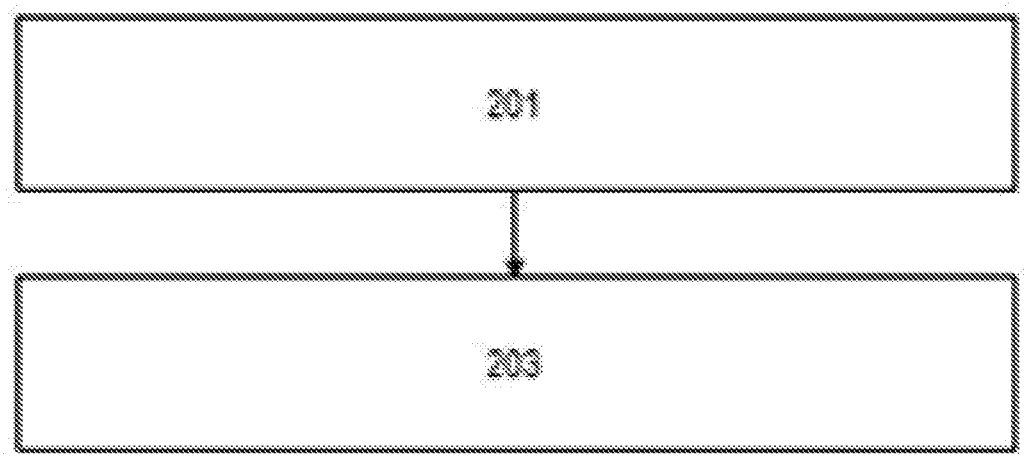
FIG. 2 is a flowchart of a method for classifying at least one source dataset.

FIG. 2 is a flowchart of a method for classifying at least one source dataset e.g. dataset 127. For example, the data classifier application 108 may receive the dataset 127 e.g. from the data source system 123. In another example, the data classifier application 108 may generate the dataset 126 at the computer system 101.

Figure 5A:
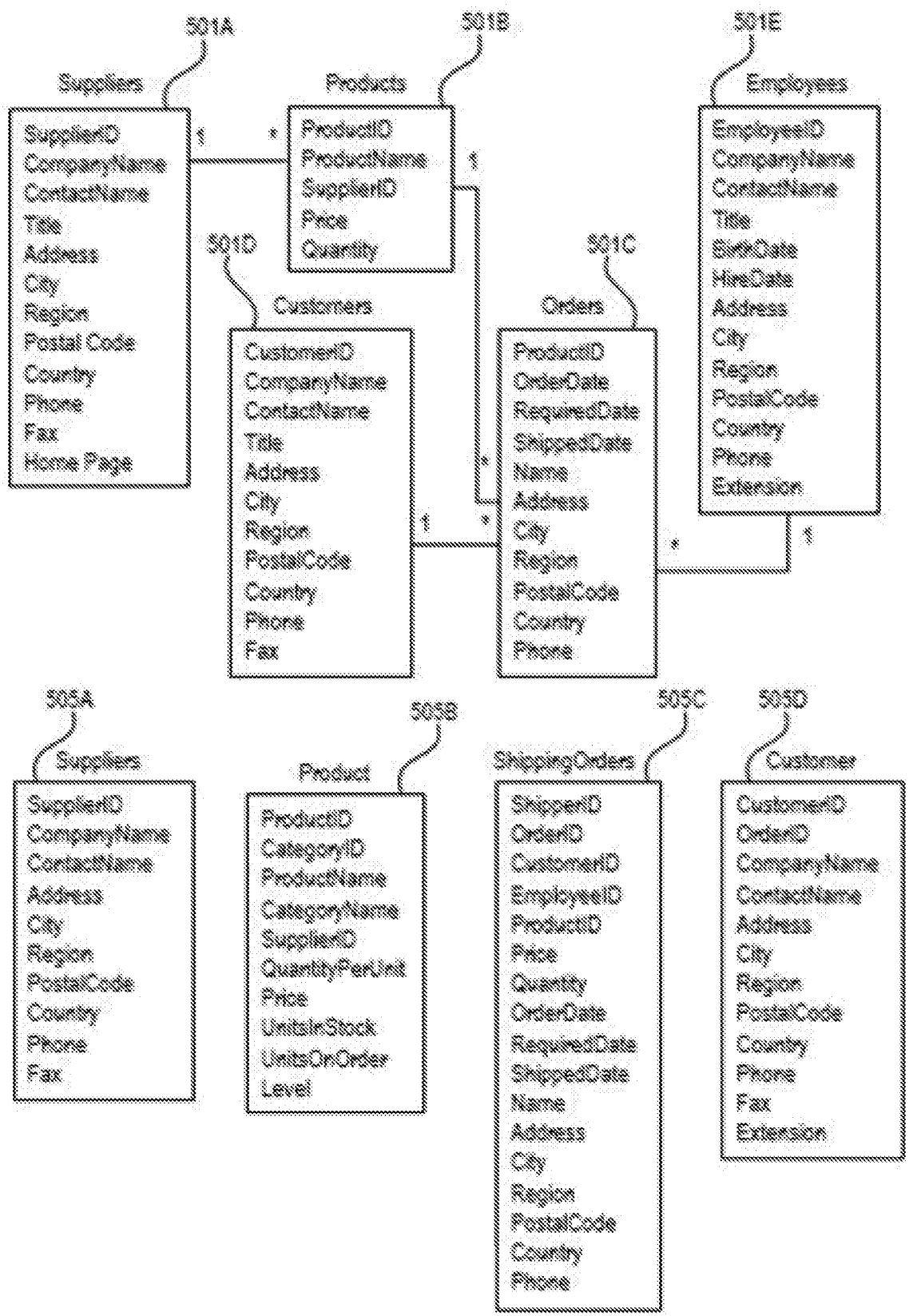
FIGS. 5A-B illustrate a simplified example method for calculating a similarity score.

The dataset 127 may comprise, for example, tables (505) as shown with reference to FIG. 5A. The tables 505A-505D may form unmanaged datasets as they are provided separate from each other and having no defined relation between them. Further, a table of the unmanaged dataset may have no name or identification that may identify its content. Although data may be provided in a structured form e.g. in tables or columns, that data may still be considered unmanaged data as the data may be provided anonymously without any metadata.

In step 201, the data classifier application 108 may calculate a first similarity score between the dataset 127 and a first reference 129A table of the reference tables 129A-N based on common attributes in the dataset 127 and a join of the first reference table 129A with at least one further reference table 129B of the reference tables 129A-N having a relationship with the first reference table 129A.

For example, the attributes of the source dataset may be computed or identified. Different methods may be used to identify the attributes in the source dataset e.g. using metadata of the source dataset. For example, in case the source dataset comprises an unnamed table, each column of that table may be an attribute candidate that can be used to compare the source dataset with the reference tables as described herein. In another example, names of columns may be indicative of the columns or attributes.

In other words, for the calculation of the first similarity score in step 201, the data classifier application 108 may select the first reference table 129A as a seed table against which the dataset 127 may be compared in order to determine the level of correlation between dataset 127 with the seed table i.e. the first reference table 129A. The first reference table 129A may be randomly selected. In another example, the first reference table 129A may be selected upon receiving an indication of the first reference table 129A from a user of the data processing system 100. And, for that comparison, the data classifier application 108 may further require one or more additional tables (i.e. the further reference table) of the reference tables 129A-N in order to perform the comparison. The first similarity score may be the result of such comparison that quantifies the correlation between the dataset 127 and the first reference table 129A.

In one example, the further reference table 129B may be selected based on the fact the further reference table 129B has a direct or indirect relationship with the first reference table 129A. For example, the first reference table 129A may be related with the further reference table 129B via a single foreign key in case of a direct relationship or via more than one FK in case of an indirect relationship. For example, table 501A of FIG. 5A has a dependency order of 1 with table 501B because there is a direct FK relationship, and has a dependency order 2 with table 501C because there is an indirect relationship involving two FKs. In an alternative or additional example, the further reference table 129B may have a one-to-one relationship with the first reference table 129A.

In a further alternative or additional example, the further reference table 129B may be selected such that the number of common attributes (referred to as second number) between the dataset 127 and the further reference table 129B is smaller than the number of common attributes (referred to as first number) between the dataset 127 and the first reference table 129A. If the first number is smaller than the second number, this may be an indication that the selected seed is not the right one and the further reference table 129B may be a better seed table or candidate for comparison with the dataset 127. The first number of common attributes may comprise the second number of common attributes. For example, if the first number of common attributes comprises attributes A, B and C, those attributes are searched in the further reference table i.e. the second number of common attributes may comprise at most A, B and C. Further or alternatively, the further reference table 129B may be selected if the second number is higher than zero.

Upon determining by the data classifier application 108 the common attributes between the dataset 127 and the first reference table 129A and the further reference table 129B, the data classifier application 108 may calculate the first similarity score using the determined number of common attributes. For example, the first similarity score may be calculated as the sum of individual scores associated respectively to the first reference table 129A and the further reference table 129B. For example, the highest the first number the highest the individual score of the first reference table 129A. And, the highest the second number the lowest the individual score of the further reference table 129B. The sum may thus be obtained in accordance with the first and second numbers. For example, the individual score of the first reference table may be proportional to the first number (e.g. equal to the first number) and the individual score of the further reference table may be inversely proportional to the second number (e.g. equal to [1/(the second number)]). Another example method for calculating of the first similarity score is shown with reference to FIGS. 5A-B. In this example, the individual scores may be weighted using the dependency order. For example, the first reference table 129A may be related to the further reference table 129B via a foreign key. The first reference table 129A may comprise the primary key and the further reference table 129B may comprise the FK. In this case, the direction indicates the originating table (i.e. 129A) of the relationship and the dependency order indicates the number of the FKs. If there is a single FK then the dependency order is one etc. in this case, the dependency order of the first reference table is 0 and for the further reference table is 1. The individual score of the first and the further reference table may be proportional to (1/(1+dependency order)).

The first similarity score may summarize the similarity between dataset 127 and the first reference table 129A.

In step 203, the data classifier application 108 may determine using at least the calculated first similarity score whether the dataset 127 is organized as the first reference table 129A within the reference storage model. For example, the calculated first similarity score may be compared against a predefined first similarity threshold. If the first similarity score is higher than the predefined first similarity threshold the dataset 127 is most likely to have a structure and/or content that is similar to the first reference table 129A. This may provide indications on how to analyze the dataset 127.

Figure 3:
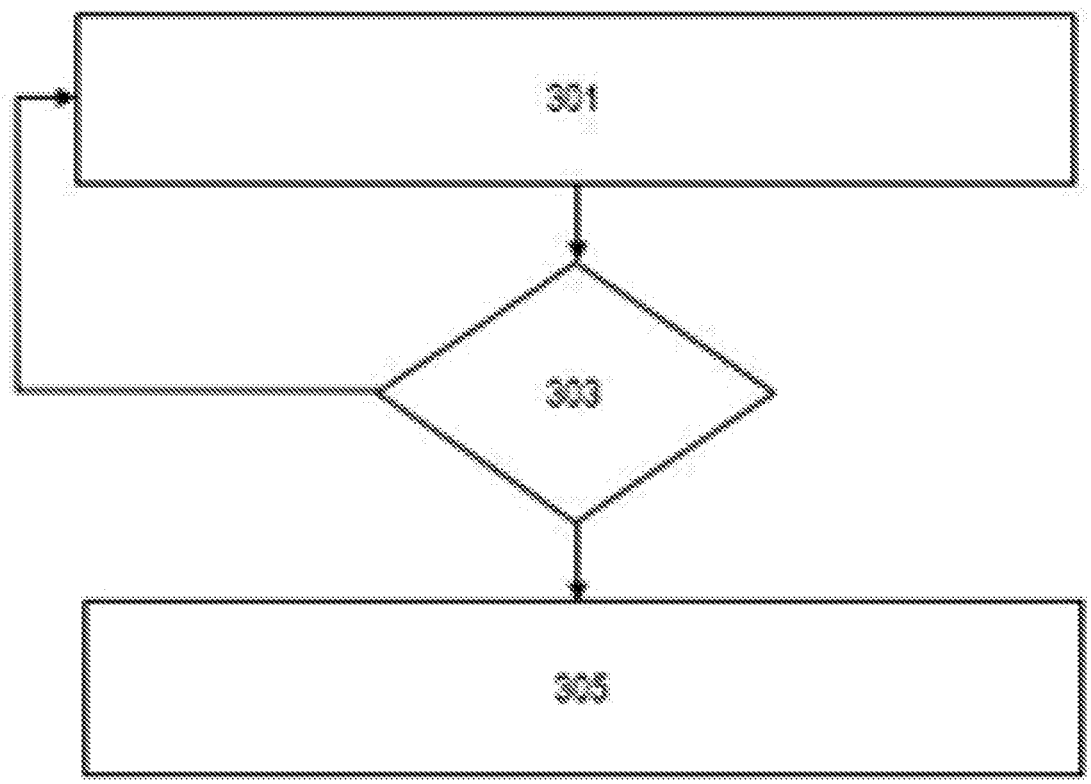
FIG. 3 is a flowchart of a method further defining the classifying method.

FIG. 3 is a flowchart of a method further defining steps 201-203.

Step 301 is first performed. Step 301 is the same as step 201. Further, the data classifier application 108 may determine (inquiry 303) if the first similarity score is smaller than the first predefined similarity threshold. If the first similarity score is smaller than the first predefined similarity threshold, step 301 may be repeated using another seed table e.g. table 129C. The repetition is performed until the first similarity score becomes higher than the first predefined similarity threshold or that all possible seeds in the reference datasets are used. In case the first similarity score is higher than the first predefined similarity threshold, step 305, which is the same as step 203 may be performed.

In another example, step 201 may be repeated until all possible seeds in the reference tables are used, and the resulting highest first similarity score may be compared with the first predefined similarity threshold. If the highest first similarity score is higher than the first predefined similarity threshold, then the dataset 127 is most likely to have a structure and/or content that is similar to the first reference table i.e. the seed that is associated with the highest first similarity score.

Figure 4:
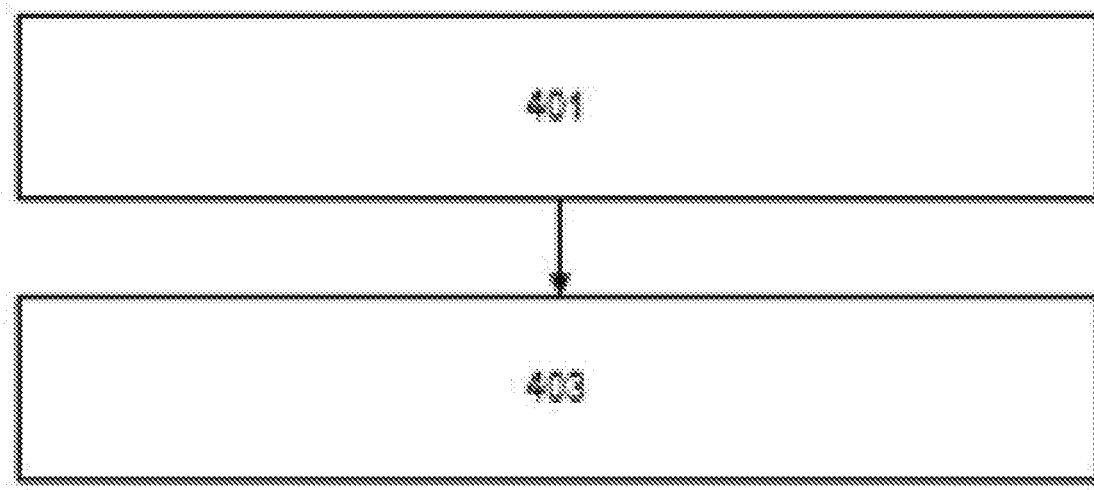
FIG. 4 is a flowchart of a method for calculating a similarity score.

FIG. 4 is a flowchart of a method further defining step 201.

In step 401, the data classifier application 108 may calculate a partial similarity score between the dataset 127 and each table of the first reference table 129A and the further reference table 129B based on respective common attributes. This may result in two partial similarity scores. The first partial similarity score may be proportional to the first number of common attributes. The second partial similarity score may be inversely proportional to the second number of common attributes (the second number may be higher than zero).

In step 403, the data classifier application 108 may combine or sum the two partial similarity scores by weighting the partial similarity scores e.g. using the following formula:

$$Score = \frac{N_{com}^0}{N_{att}^0} + \sum_{i=1}^{m} \frac{1}{N_{com}^i * N_{att}^i}$$

$N_{com}^0$ is the number of common attributes between the first reference table and the source dataset.

$N_{att}^0$ is the number of attributes in the first reference table.

$N_{com}^i$ is the number of common attributes between the further reference table i and the source dataset.

$N_{att}^i$ is the number of attributes in the further reference table i.

m is the number of further reference tables.

The first similarity score (Score) reflects the overall similarity between two compared dataset 127 and the first reference table 129A. The first similarity score may be directly related to the number of similarities between dataset 127 and the first reference table 129A in elements and/or attributes of high importance.

Figure 5B:
Figure 5B:

FIG. 5A-B is a simplified example for calculating a similarity score in accordance with the present disclosure.

The present example provides a reference model made up of a list of managed datasets (or data tables) 501A-E and unmanaged data set(s) 505A-D which need(s) to be matched to a managed data set e.g. 501A of the reference model in order to be classified.

In step 1, weights may be provided for each attribute in the reference model. For that, each attribute D in the reference model is identified and its cardinality is found, where cardinality is the number of times the attribute D is found in the reference model i.e. in datasets 501A-E. Next, a weight may be assigned to attribute D as 1/Cardinality. The reason of computing this weight is having that an attribute of an unmanaged dataset e.g. 505A which only appears in a particular managed dataset is a stronger indication that the unmanaged dataset 505A represents the same dataset domain as if they have a field domain in common which is present in many different managed dataset.

For example, table 513 of FIG. 5B shows for the managed dataset "Suppliers" weights for all attributes in that dataset. If an attribute occurs multiple times in different datasets in the reference model, it contributes less to the identification of the appropriate data set. Thus, the weight is scaled by the cardinality of the attribute D in the reference model.

Further, in step 2, the equation (e.g. the first equation described above) may be applied for each pair of an unmanaged dataset to classify and managed data set candidate for a classification and returns the correlation values for each of these pairs. The equation defines a "Score" that is calculated for each pair (unmanaged dataset, managed dataset). Pairs may comprise, for example, (505A,501A), (505A,501B), (505A,501E) and so on.

The Score measures the correlation between the unmanaged data and a managed data set. The summation for the Score expresses basically the following:

S0 is a partial score quantifying the comparison result of an unmanaged dataset e.g. 505A with a managed dataset e.g. 501A in the reference model.

$S_i$ (indice i is similar to dist described above) is a partial score quantifying the comparison result of the unmanaged dataset 505A with a managed dataset (one of 501B-E) in the reference model which is i degrees away from the managed dataset 501A (measured in FK relationship distances). For example, dataset 501B is 1 degree away from 501A as it relates to 501A with a single FK, and 501C is 2 degrees away from 501A as it relates to 501A with two FKs.

The divisor (1/(1+i)) expresses that the similarity on data sets i degrees away should be smaller the farther away the data set Si is from S0

Each Si is the sum across all attributes ds that are common between the datasets of a given pair. For example, for S0 the sum shall be performed over attributes of 505A that also appears in 501A.

$N_{DS}$ is the number of attributes in the unmanaged dataset $N_{DT}$ is the number of attributes in the managed source reference model The factor of 2 times Wd is for normalization Wd is the weight of attribute as described above.

Step 2 may be performed by a reorder of reference datasets/tables, so that dataset's or tables with no joins may be processed first i.e. selected as seed. In another example, a table of the reference tables having the highest number of attributes may be first processed i.e. may be first selected as a seed table for the present method.

At the end a table 515 of FIG. 5B summarizes correlation values i.e. Score values (which is normalized between 0.0 and 1.0) for each unmanaged dataset against each dataset in reference model.

As shown in the results table in the underlined row: the unmanaged dataset "Shipping Orders" has the strongest correlation with the "Orders" dataset from the reference model. "Customer" has a much higher relationship to "Orders" than "Product" because there are several fields from customers in the orders dataset but only the product ID from the product data set.

What is claimed is:

1. A computer program product for classifying at least one source dataset, the computer program product comprising a non-transitory computer readable storage medium having program instructions embodied therewith, the program instructions executable by a processor to cause the processor to provide a plurality of associated reference tables organized and associated in accordance with a reference storage model;

calculate a first similarity score between the source dataset and a first reference table of the reference tables based on common attributes in the source dataset and a join of the first reference table with at least one further reference table of the reference tables having a relationship with the first reference table wherein calculating the first similarity score comprises calculating a partial similarity score between the source dataset and each table of the first reference table and the at least one further reference table based on respective common attributes and combining the partial similarity scores by weighting the partial similarity scores in accordance with the order and a direction of the relationship between the first reference table and each of the at least one further reference table, wherein the at least one further reference table is selected based on at least one of the further reference table has a direct relationship with the first reference table, the further reference table has an indirect relationship with the first reference table, and the number of common attributes between the source dataset and the further reference table is smaller than the number of common attributes between the source dataset and the first reference table;

classify the source dataset by determining using at least the calculated first similarity score whether the source dataset is organized as the first reference table in accordance the reference storage model.

2. A computer system for classifying at least one source dataset, the computer system being configured for:

providing a plurality of associated reference tables organized and associated in accordance with a reference storage model;

calculating a first similarity score between the source dataset and a first reference table of the reference tables based on common attributes in the source dataset and a join of the first reference table with at least one further reference table of the reference tables having a relationship with the first reference table, wherein calculating the first similarity score comprises:

calculating a partial similarity score between the source dataset and each table of the first reference table and the at least one further reference table based on respective common attributes; and combining the partial similarity scores by weighting the partial similarity scores in accordance with the order and a direction of the relationship between the first reference table and each of the at least one further reference table; and classifying the source dataset by determining using at least the calculated first similarity score whether the source dataset is organized as the first reference table in accordance the reference storage model.

3. The computer system of claim 2, further comprising:

repeating the step of calculating for a second reference table of the reference tables, wherein determining comprises comparing the first and second similarity scores for determining whether the source dataset is organized as the first reference table or as the second reference table in accordance with the reference storage model.

4. The computer system of claim 2, wherein the repeating is performed in response to determining that the first similarity score is smaller than a predefined similarity threshold.

5. The computer system of claim 2, wherein the source dataset is received from a source system or imported from the source system or generated, wherein the source dataset comprises at least one of a table, a text file, a binary data, and file having a hierarchical format.

6. The computer system of claim 2, wherein the first reference table is related to the at least one further reference table via a foreign key (FK) wherein the direction indicates originating table of the first and further reference tables that comprises the primary key, wherein the order indicates the order of the FKs.

7. The computer system of claim 2, wherein calculating the partial similarity score between the source dataset and the at least one further reference table comprises:

processing at least one match rule for matching values of an attribute of the source dataset with attribute values of the further reference table; and determining a matching score indicating the level of matching between content of the source dataset and content of the further reference table, wherein the lowest the matching score the highest the partial similarity score.

8. The computer system of claim 2, wherein determining a common attribute between the source dataset and the first reference table or the further reference table comprises:

determining a first attribute domain for the common attribute in the source dataset;

determining a second attribute domain for the common attribute in the first reference table; and comparing the first and second attribute domains.

9. The computer system of claim 2, wherein determining comprises comparing the first similarity score with at least one predefined similarity threshold.

10. The computer system of claim 2, wherein the reference storage model provides objects, relational databases and/or indexed files.

11. The computer system of claim 2, further comprising retrieving the classified source dataset.

12. The computer system of claim 2, further comprising using the reference storage model and at least part of the reference tables for analyzing the source dataset if classified as the first reference table.

* * * * *